United States Patent

Cedar et al.

[11] Patent Number: 4,697,240
[45] Date of Patent: Sep. 29, 1987

[54] METHOD FOR MAKING MODELS USING SIMULTANEOUS CONSTRUCTION AND CAD/CAM TECHNIQUES

[75] Inventors: Dennis A. Cedar, Troy; Ralph L. Miller, Bloomfield Hills, both of Mich.

[73] Assignee: Modern Engineering Service Company, Warren, Mich.

[21] Appl. No.: 738,604

[22] Filed: May 28, 1985

[51] Int. Cl.$^4$ .............................................. G06F 15/46
[52] U.S. Cl. ...................... 364/474; 364/168; 364/171; 364/188; 364/191
[58] Field of Search ........ 364/167, 168, 171, 191–193, 364/474, 475, 513, 188; 318/568

[56] References Cited

U.S. PATENT DOCUMENTS

| | | | |
|---|---|---|---|
| 3,534,396 | 10/1970 | Hart et al. | 364/474 |
| 3,548,173 | 12/1970 | Pascoe et al. | 364/474 |
| 4,385,360 | 5/1983 | Yamada et al. | 364/475 |
| 4,393,450 | 7/1983 | Jerard | 364/475 |
| 4,469,930 | 9/1984 | Takahashi | 364/475 |
| 4,546,427 | 10/1985 | Kishi et al. | 364/168 |
| 4,551,810 | 11/1985 | Levine | 364/475 |
| 4,558,420 | 12/1985 | Gerker | 364/474 |
| 4,575,805 | 3/1986 | Moermann et al. | 364/474 |

Primary Examiner—Jerry Smith
Assistant Examiner—John R. Lastova
Attorney, Agent, or Firm—Harness, Dickey & Pierce

[57] ABSTRACT

A sturdy three-dimensional master model constructed using CAD/CAM and N/C machine tool techniques by digitally processing surface data to obtain low density, unsweetened, template contour lines offset below the surface on an axis normal thereto, and then simultaneously constructing a rough model having a surface offset above the surface on an axis normal thereto, while developing the surface data to sweetened, high density cutter path data and then using the cutter path data to N/C mill the rough plus model.

16 Claims, 4 Drawing Figures

METHOD FOR MAKING MODELS USING SIMULTANEOUS CONSTRUCTION AND CAD/CAM TECHNIQUES

BACKGROUND AND SUMMARY OF THE INVENTION

The present invention relates to a method for constructing a model using computer assisted design and numerical control machine techniques wherein construction of the physical model is begun prior to completion of determination of surface data defining the completed model. The method of the present invention is particularly well adapted for making a model of an automobile body.

The design of an automobile body generally begins with a stylist's sketch of a shape which leads to the construction of a full scale stylist's clay model. The stylist's clay model provides a three-dimensional structure facilitating an appreciation of the esthetic appeal of the design which is difficult to fully appreciate from two-dimensional sketches or scaled down models. The stylist's model also provides a working medium allowing the addition of surface details and engineering development to meet fabricating and engineering requirements. Thus, after initial construction of the stylist's clay model, it is subjected to a substantial amount of analysis, evaluation and testing leading to the evolution of the final design. To facilitate the numerous changes made during this process, the stylist's clay model is made of relatively soft clay which is easily damaged and must be frequently repaired after being moved for wind tunnel testing or the like. Thus, once the stylist's clay model is refined to its final form, a more sturdy model, such as a wood model, is constructed for making dies.

It is known to use computers for the design and analysis of the surfaces which make up an automobile body. CAD/CAM (computer assisted design/computer assisted manufacturing) and N/C (numerical control) cutter techniques are now well known in the automobile and other industries and CAD/CAM and N/C hardware and software are readily commercially available. Early U.S. patents relating to the use of computer technology in automobile design include the Hart, et al. patent. U.S. Pat. No. 3,534,396, Oct. 13, 1970 to Hart, et al. teaches a method of analyzing and further developing graphical information utilizing digital computer in which information in a graphical form is translated into a form that can be accepted by a digital computer and is read into the computer in the translated form. The computer then translates the information into graphical form which can be viewed by an operation-designer who then modifies the graphical representation and feeds information into the computer in accordance with a modification or development of the information that is graphically displayed. When the operator-designer is satisfied with his design, the computer contains a representation of this design and the computer is capable of supplying a representation of the final design which then can be converted into various graphical forms such as a drawing. Another U.S. patent relating to numerically controlled surface development method for preparing automobile body contours is U.S. Pat. No. 3,548,173 Dec. 15, 1970 to Pascoe et al. The Pascoe, et al. patent relates to methods for determining analytically the geometric characteristics of an automobile body and subsequently using the analytical data for a numerical control system for a machine tool such as a multiple axis milling machine.

Present design and model making techniques generally involve a sequential procedure wherein surface data is first fully processed to high density data in the computer and then the data is used to drive an N/C mill or cutter. In the automotive field, a full size clay model is constructed, then the geometric data defining the body contours of the clay model is fed into a computer, smoothed and sweetened, evaluated for compatibility with engineering and fabrication requirements, welding points, internal structure, and so forth, and subsequently utilized to make models of the automobile body parts using N/C techniques. The geometric data is not obtained until the design of the clay model is essentially complete. The construction of the wood models does not begin until the geometric data has been processed and analyzed by the computer. The sequential nature of this design procedure is time consuming and requires that the final body contour design be well established before construction of the wood models can begin.

The method of the present invention is an improvement over the above-mentioned procedure wherein CAD/CAM and N/C machine techniques are employed in a manner which shortens the time and lowers the cost for making a model. Thus, in accordance with the present invention, a sturdy three-dimensional master model is constructed using CAD/CAM and N/C machine tool techniques by digitally processing surface data to obtain low density, unsweetened, template contour lines offset below the desired surface on an axis normal thereto, and then simultaneously constructing a rough model having a surface offset above the desired surface on an axis normal thereto, while developing the low density surface data to sweetened, high density cutter path data and then using the cutter path data to N/C mill the rough model to the desired surface.

DESCRIPTION OF THE INVENTION

In accordance with the present invention, a novel model making method uses CAD/CAM and N/C machine cutting techniques allowing for construction of a rough physical model based on low density data while CAD/CAM data is simultaneously densified and sweetened. The rough physical model has a surface offset above the desired final surface on an axis normal thereto. The high density data is then used to N/C mill the final surface of a master model. The procedure of the present invention is particularly well adapted to allow construction of automotive type models to start prior to completion of product computer data and facilitates styling and design changes. It will be appreciated that most design changes involve relatively small dimensions and can be accommodated by additional milling if the surface is to be moved inwardly, or by adding small amounts of material for milling if the surface is to be moved outwardly. Furthermore, substantial design changes can also be accommodated by inserts in the area of the change. The present invention reduces the time required to make a master model and also lowers the cost for making the master model.

Figure 1:
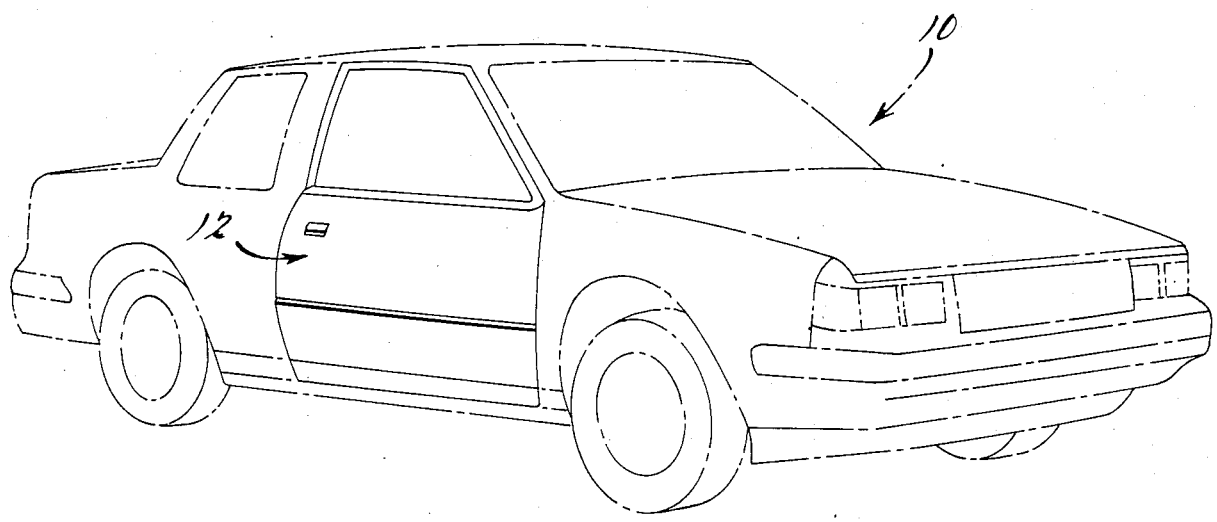
FIG. 1 is a perspective view, in broken lines, of an automotive vehicle with a door thereof shown in full lines.
Figure 2:
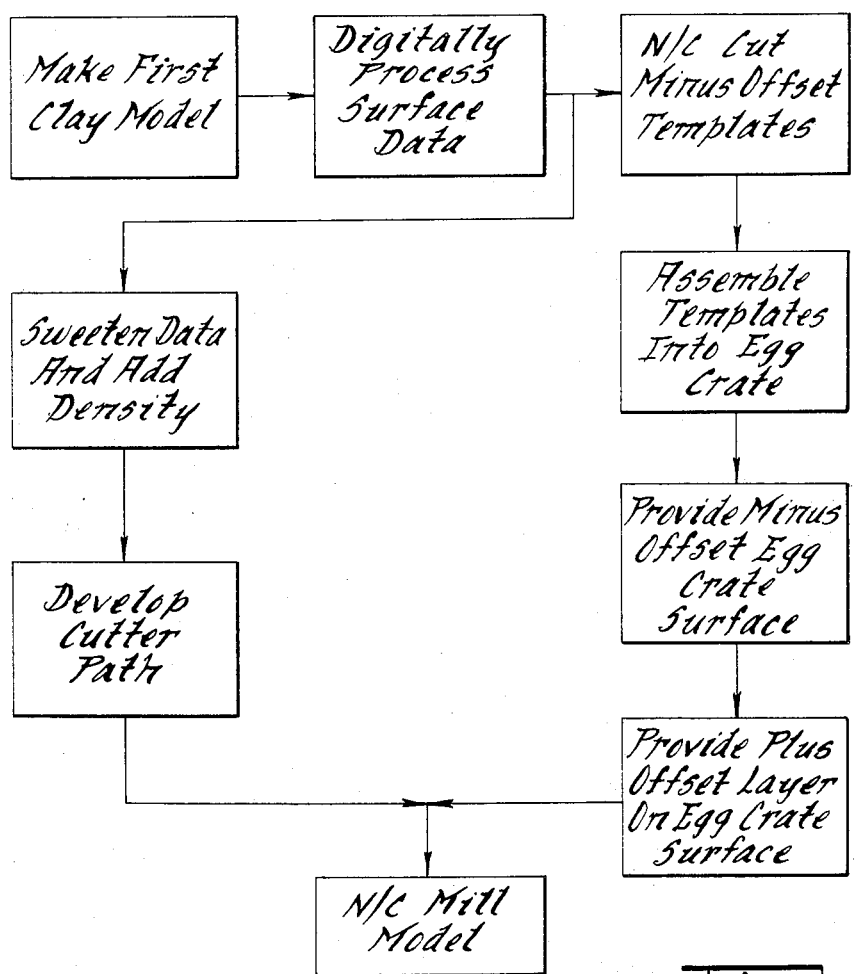
FIG. 2 is a block diagram of the method of the present invention.

Now referring to the figures, FIG. 1 illustrates a styling clay model of an autmobile, indicated generally by the numeral 10. The art of automotive design generally includes creation of a styling clay model in full size so that the actual appearance of the automobile can be fully appreciated and also so that the stylist's suggested shape can be finalized with respect to fabricating and engineering requirements. The method of the present invention is particularly well adapted for use in making a automotive model and the description of the preferred embodiment is cast in terms of making an automotive model. However, it will be appreciated that the method of the present invention can be employed in conjunction with making models generally and such other models are contemplated to be within the broad scope of the present invention.

Generally speaking, in accordance with the first step of the present invention, surface data of a three-dimensional model is digitally processed in a conventional manner to identify points on "X", "Y" and "Z" axes describing the surface initially to a low density degree. For example, once a styling clay model 10 has been constructed, the surface thereof can be digitized as by scannng in a conventional manner. The surface data is then digitally processed to describe a surface and the information used to cut templates which are offset below the surface on an axis normal thereto. The templates are then assembled into an egg crate structure. The surface area between templates in the egg crate structure is then filled in an overlayered with a layer to provide a rough model having a surface which is offset above the desired surface on an axis normal thereto. While carrying out the above steps, the low density data is further processed to increase the density and sweeten the data which is then used to develop a cutter path for a N/C mill which N/C mill cuts the rough model surface to the final desired surface. The resulting master model can be used for wind tunnel testing, to cast fiberglass models for further styling evaluation or other uses.

Now referring to FIG. 1, a full-scale styling clay model 10 is illustrated in broken lines with the right door thereof in full lines. Styling clay model 10 is scanned in a conventional manner to obtain surface data generally defining the surface thereof on "X", "Y" and "Z" axes. In accordance with this invention, styling clay model 10 can be scanned relatively early in the design process, to obtain "rough" or "low density" surface data since the data is further refined and updated before N/C milling the final model. Scanning can suitably be generally on 100 mm spacing with closer spacing in areas of complex surface configuration. Alternatively, surface data can be derived directly from a computer assisted design process without construction of a styling clay model or the like.

Once having low density surface data in hand, the data is processed in a conventional manner to develop a wire frame plot plan. This can be done, for example, using an Applicon Computer System PDP1134 mainframe with Applicon Series 4000 GPF work stations and with Applicon automatic engineering body software. The wire frame plot plan provides the information to produce a set of egg crate type templates. In accordance with the present invention, the templates can be based on a data base of relatively low density, for example, a Body Grid System of 100 mm by 100 mm.

The egg crate templates can be constructed by, for example, plotting on paper the wire frame plot plan with the surface offset a dimension below the surface of the full size wire frame plot plan in a direction normal to the surface. In short, the template edges should define a surface offset by some appropriate dimensions (in a typical application, this might be about ⅜" below the rough computer data for the face of the object). The paper plots can be used to produce ⅛" to ¼" thick wood hard board type templates. The hard boad material is layed out to the plot information and saw cut to final shape, including the grooves required for egg crate effect. Preferably, however, the making of paper plots is not required. The same plot data base can be used to drive a conventional N/C laser machine to directly produce complete templates defining an offset surface, and egg crated at the body grid lines for the egg crate effect. The use of a laser cut eliminates the paper plot requirement and much of the hand labor to prepare the egg crate templates for assembly.

Once cut, the completed ege crate frame templates are assembled. The grooves at the body grid areas interlock to produce a three-dimensional object (egg crate effect). The egg crate structure is glued together and set on a base type structure to insure structure integrity and base relations to the computer data base.

Figure 3:
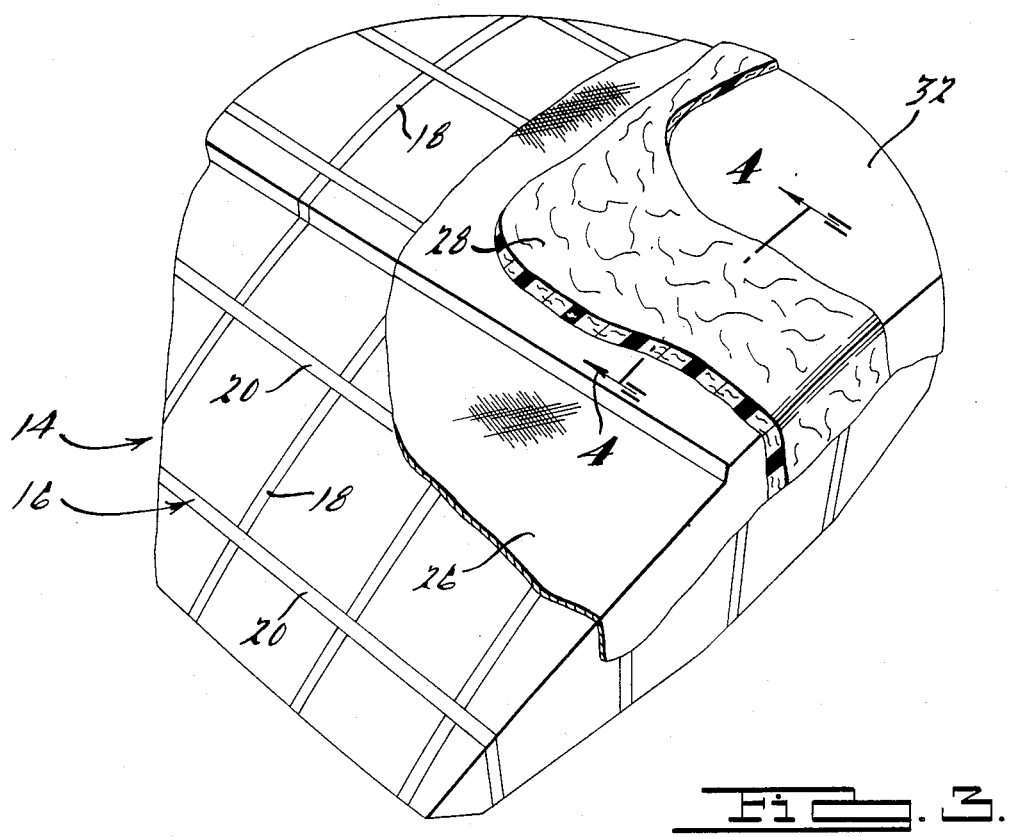
FIG. 3 is a perspective view, broken away, showing the structure of a model of an automobile door constructed in accordance with the present invention.
Figure 4:
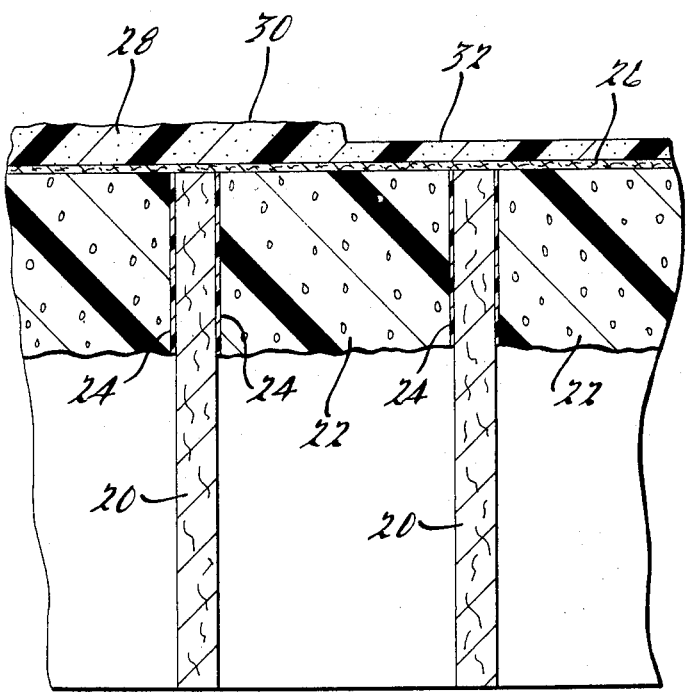
FIG. 4 is a sectional view taken along line 4—4 in FIG. 3.

This structure is illustrated in FIG. 3, where a model door 14 is shown with egg crate type grid structure 16 comprised of a plurality of interlocking templates 18 and 20.

Once having obtained the low density surface data from which the wire frame plot is constructed, the data base is expanded in further processing to add density, smooth lines, "sweeten" the data, correct for design changes and so forth in order to develop final N/C cutter path data to N/C mill the model of the present method. This further processing of data occurs simultaneously with the construction of a plus offset model structure as further set forth below.

After assembling templates 18 and 20 into egg crate structure 16, the spaces between templates 18 and 20 are partially filled in with foam blocks 22 which are glued in place by glue 24 against templates 18 and 20 to provide a surface between the edges thereof. Suitable foam is tooling foam such as low density polyurethane foam. To economize on materials, it will be appreciated that foam blocks 22 need fill only the spaces proximate to the desired surface. The thickness of foam is not critical. For a model of automotive door 14, foam of about 2" to 3" in thickness is shown.

Foam 22 is worked down into the egg crate structure 16 and ground or filed if necessary to be flush with the edges of the templates. To insure integrity of the egg crate structure, a layer 26 of fiberglass cloth impregnated with epoxy resin is layered and cured in place on the surface of the egg crate structure. Layer 26 is a thin sheet, for example about 0.020 inches in thickness, providing a surface offset under the final desired surface.

Layer 26 of the offset structure is then overlayered with a millable material such as BLEM "tooling clay" to provide a rough outer layer 28 which has a surface 30 offset above the final desired surface on an axis normal thereto. BLEM tooling clay is a two-part epoxy resin system which is mixed, rolled to the desired thickness and then applied to layer 26. The epoxy clay-type material cures to provide a rigid and hard rough model with, for example ⅜" offset of excess stock to be subsequently removed by N/C machine.

The completed rigid rough model is now cut by N/C machining, for example on a Taris N/C mill, based on the sweetened and densified data processed while the rough model was being constructed to provide a finished surface 32. The finished simultaneous model now can be used for any future purpose traditionally requiring models. The model now constructed can be used for wind tunnel testing by hanging on suitable underbody and cooling attachments. The model can also be used to create fiberglass models for more realistic styling evaluation. The egg crate structure of the model can be so constructed that modules can be removed and replaced by alternative styling themes. Typical modules might be a front end module, a rear end module, a roof module, etc.

As the styling clay is further refined, the present invention allows alterations to be made to the master model. Additional tooling clay can be added to the surface of the master model and then N/C milled if the surface is to be raised or portions of the model can be cut out below the surface, tooling clay added and then milled. The model can even be constructed with isolated inserts of styling clay to make critical areas easy to change. This could be especially advantageous if, for example, a model having a easily modified surface in a critical area were desired such as would be particularly useful in aerodynamic testing. The fiberglass models can be constructed in such a way that they can be upgraded as the program evolves. The initial model can be a fiberglass exterior with a see-through upper and a dummy interior down to the level of approximately the bottom of the steering wheel. Such a model allows good exterior styling evaluation. The same model can later be upgraded to a full interior/exterior buck by cutting out and hinging the doors and adding interior features. With careful pre-planning this upgrading process can continue in such a way that actual mechanical components are added, producing an early running concept vehicle. The original master model can also be used as a tooling aid for the construction of prototype, and eventually production tooling.

Thus, the method of the present invention offers many advantages. For example, the method can be used in conjunction with a coordinated pre-planning of all the tooling aids and properties needed throughout the design cycle. Required aids need not be manufactured at each step in the process, without consideration for related aids which may have been required earlier or will be required later. Furthermore, the method allows one relying on computer data bases and numerical control machining techniques to move from one level or refinement to the next without starting all over again with drawings of scan lines when new properties need to be produced. The same data base can be constantly upgraded and properties can be produced by automatic means more quickly and economically than by traditional construction models.

It will be understood that the present invention has been described with reference to a preferred specific embodiment but that this description is illustrative in nature. Modifications and variations of this invention will occur to those skilled in the art and are intended to be within the scope of this present invention which is intended to be limited only by the following claims.

What is claimed is:

1. A method for constructing a three-dimensional master model using computer assisted design and numerical control machine tool cutter techniques, said method comprising the steps of digitally processing relatively low density surface data to obtain male template contour lines; producing a set of male templates from said contour lines, the edges of said templates being offset a first dimension below a surface on an axis normal thereto; assembling said templates into an egg crate type structure comprising spaced templates with edges generally defining a desired master model but offset below a final desired surface on an axis normal thereto; filling in spaces between said templates edges to provide a substantially continuous surface; providing a layer of millable material on said surface, said layer being of a thickness greater than said first dimension to thereby provide a rough model having a surface offset above said final desired surface on an axis normal thereto; sweetening said relatively low density surface data to provide relatively higher density surface data and then N/C milling said surface of said rough model to a desired surface using said relatively higher density surface data.

2. The method of claim 1 wherein an intermediate structural layer is sandwiched between said substantially continuous surface and said layer of millable material for increased structural integrity of said egg crate type structures.

3. The method of claim 1 wherein said high density data is developed simultaneously with said steps of producing said templates, assembling said templates into said egg crate structure, filling in spaces between template edges, and providing a layer of millable material on said surface.

4. The method of claim 3 wherein said high density data is developed by adding density to said low density contour lines and, in addition, by making selected modifications to said high density data to modify the surface characteristics of said master model.

5. The method of claim 4 wherein said spaces between template edges are filled in with foam and said millable material comprises tooling clay.

6. The method of claim 4 wherein said surface data is obtained from styling model.

7. The method of claim 6 wherein said selected modifications to said high density data are derived from changes made to said styling model subsequent to said step of digitally processing surface data.

8. The method of claim 7 wherein said master model comprises a plurality of modules.

9. The method of claim 7 wherein a portion of said master model comprises an insert of styling clay.

10. The method of claim 4, wherein said surface data is obtained by determining the geometric characteristics of a surface of a full size model.

11. The method of claim 10 wherein said model represents a part of automotive vehicle.

12. The method of claim 4 wherein said surface data is obtained by determining the geometric characteristics of a surface of a less than full size scale model.

13. The method of claim 12 wherein said master model represents a part of automotive vehicle.

14. The method of claim 1 wherein said master model is comprised of a plurality of modules.

15. The method of claim 1 wherein said master model comprises an insert of styling clay.

16. The method of claim 1 wherein said master model is subsequently used to cast additional models.

* * * * *

UNITED STATES PATENT AND TRADEMARK OFFICE
CERTIFICATE OF CORRECTION

PATENT NO. : 4,697,240

DATED : September 29, 1987

INVENTOR(S) : Dennis A. Cedar and Ralph L. Miller

It is certified that error appears in the above-identified patent and that said Letters Patent is hereby corrected as shown below:

Column 3, line 29, "scannng" should be --scanning--.

Column 4, line 8, "dimensions" should be --dimension--.

Column 4, line 12, "boad" should be --board--.

Column 5, line 13, "of" should be --for--.

Column 5, line 27, "a" second occurrence should be --an--.

Column 6, line 13, "templates" should be --template--.

Signed and Sealed this

Ninth Day of August, 1988

Attest:

DONALD J. QUIGG

Attesting Officer

Commissioner of Patents and Trademarks